Figure 1:
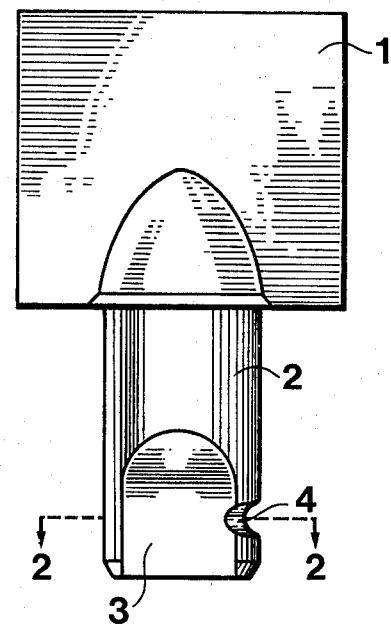

United States Patent [19]

Persson

[11] 4,212,559
[45] Jul. 15, 1980

[54] MEANS FOR CONNECTING A MALE PART WITH A FEMALE PART

[75] Inventor: Anders E. Persson, Sandviken, Sweden

[73] Assignee: Sandvik Aktiebolag, Sandviken, Sweden

[21] Appl. No.: 913,540

[22] Filed: Jun. 7, 1978

[51] Int. Cl.² ............................................. F16B 3/04
[52] U.S. Cl. .................... 403/348; 403/379; 37/142 A; 299/92
[58] Field of Search ............... 299/92; 403/343, 348, 403/349, 379, 378, 350, 351, 353; 37/142 A; 279/79, 86, 76, 97

[56] References Cited

U.S. PATENT DOCUMENTS

| 271,143 | 1/1883 | Smith | 279/97 UX |
|---|---|---|---|
| 965,131 | 7/1910 | Bliss | 403/379 X |
| 2,350,565 | 6/1944 | Mills | 279/76 |
| 2,365,425 | 12/1944 | Miller | 279/76 X |
| 2,968,488 | 1/1961 | Kubel et al. | 279/76 X |
| 3,625,554 | 12/1971 | Mottals | 403/353 X |
| 3,751,115 | 8/1973 | Proctor | 37/142 A X |
| 3,796,464 | 3/1974 | Hansen et al. | 403/378 X |

FOREIGN PATENT DOCUMENTS

45310 12/1910 Austria ..................................... 403/379

Primary Examiner—Andrew V. Kundrat
Attorney, Agent, or Firm—Burns, Doane, Swecker & Mathis

[57] ABSTRACT

The invention relates to an apparatus for connecting a male part to a female part, of the type wherein the female part comprises a hole and a locking pin extending eccentrically across the hole. The male part comprises a cylindrical shank, the shank including a groove for engagement with the locking pin. The periphery of the shank includes a beveled portion of sufficient depth to allow a lower portion of the shank to pass the locking pin during insertion of the shank into the hole. The groove is disposed in such lower portion of the shank and is arranged to receive the locking pin in response to rotation of the shaft to prevent withdrawal of the shank.

11 Claims, 5 Drawing Figures

U.S. Patent  Jul. 15, 1980  4,212,559

MEANS FOR CONNECTING A MALE PART WITH A FEMALE PART

This invention relates to means for connection of a male part with a female part provided with a locking device, said means being suitable for use in for instance coal mining machines. The female part in the form of a holder is fastened to the machine, while the male part comprising a tool is detachably fastened into the female part.

A very important requirement in coal mining machines and other similar machines is that it should be possible to take the tool out of and place it back into the holder with a minimum of handling so that the time of standstill of the machine is reduced.

This invention meets the mentioned requirement, and, at the same time, the male part is safely and reliably kept in its place in the female part. This is important because there must be no risk that the male part gets loose during operation of the machine, since this would not only lead to large expenses for replacing the lost tool but also substantially reduce the efficiency of the machine.

By German "Offenlegungsschrift" No. 2.011.359 is previously known a device for connecting a tool with a holder provided with a locking device. The tool shank has rectangular form and is provided with a recess for co-operation with the locking device. In a fastening step the tool is put into the holder in which there is made a rectangular corresponding hole, and is forced past the locking device which snaps into the recess. Owing to the design of the locking device and the recess there is a great risk for the tool to be wrenched off when heavily loaded. In addition, the tool is sensitive to side forces because of the rectangular form of the shank which fact can also lead to the tool getting loose during operation.

Another publication, U.S. Pat. No. 3,796,464 discloses a tool which is rotatably fastened in a holder and provided with a cylindrical shank.

In a groove extending around the whole periphery of the shank there is a metal pin engaging which pin is embedded in an elastic material permitting the pin to yield aside when the tool is inserted into the holder. This device does not permit a reliable attachment of the rotatable tool, since the elastic material is rapidly exhausted, whereby there is a great risk for the tool to get loose from the holder.

By this invention, a very safe fastening of the male part in the female part is achieved. In addition, the exchange of the male part can be done easily and quickly. Because of the cylindrical form of the shank of the male part, this type of connection is capable of absorbing forces from all directions without the functional efficiency being reduced.

Figure 2:
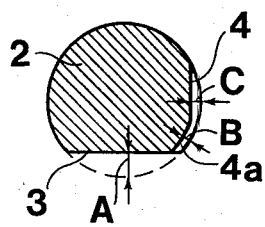
Figure 3:
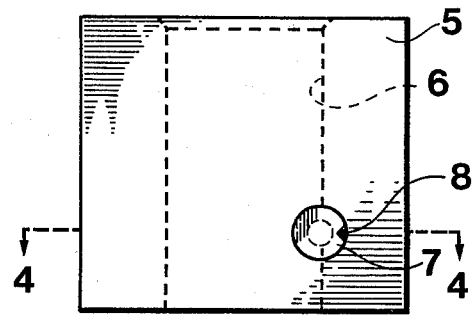
Figure 5:
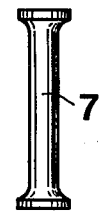
Figure 4:
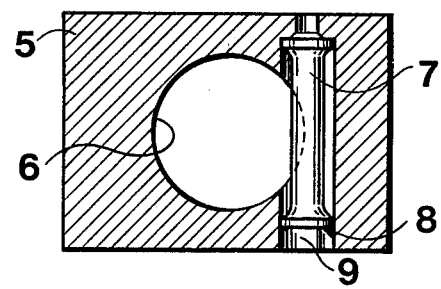

One embodiment of the invention shall be more closely described with reference to the accompanying drawing, in which FIG. 1 shows a tool;
FIG. 2 is a section along the line 2—2 of FIG. 1;
FIG. 3 shows a holder for the tool;
FIG. 4 is a section along the line 4—4 of FIG. 3; and
FIG. 5 shows a locking pin.

The male part comprises a tool consisting of a cutting part 1 with a cylindrical shank 2. In the lower part of the shank there is a bevelled portion 3 extending in the axial direction. In the shank there is also a groove 4 extending along a part of the periphery of the shank and merging into the bevelled portion 3 by an intermediate groove portion 4a.

The female part comprises a holder 5, in which there is a hole 6 having a diameter fitted to the diameter of the tool shank. Extending eccentrically across the hole there is positioned a locking pin 7 for instance made of steel which pin is fixed by a spot weld 8 in a bore 9 in the holder 5. The pin 7 is thus disposed orthogonally relative to the axis of the hole 6.

When the tool is inserted into the holder, the bevelled portion 3 permits the lower part of the shank to pass the locking pin 7. When the tool is completely inserted into the holder, i.e. when the cutting part 1 abuts the holder 5, the groove 4 is in line with the locking pin 7. Thereupon the tool is turned in relation to the holder. Since the distance B (see FIG. 2) is smaller than the distance A and is smaller than the distance between a side 6' of the hole and a side 7' of the pin located closest to the axis of the hole, the locking pin 7 will be bent and yielded aside. When continuing the turning to the stop position which occurs after a turning of 90° the locking pin will spring back, as the distances C is somewhat larger than B. The tool is now locked in this position and is held by the spring force of the locking pin. Thus, the groove 4 includes a first portion 4a which communicates with the beveled portion 3 of the shank and is at the same level with the pin 7 when the male part has been inserted as far as it can go into the female part. The groove also includes a second portion 4b which receives the pin in a final installed portion of the shank. The depth B of the first groove portion is such as to cause the pin to be initially bent in a direction away from the shank during initial rotation of the shank. The depth C of the second groove portion is greater than the depth of the first groove portion to allow the pin to return partially from its initially bent condition to a final bent condition, so that the pin engages within the groove to resist reverse rotation of the shank.

The invention is of course not limited to the described embodiment but can be modified within the scope of the following claims. The invention is neither limited to the indicated area of use but can be applicable within the whole field of mining industry as well as for several types of drilling aggregates. For instance, the tools of an aggregate for a raise boring can be attached by means of this type of connection. Furthermore, detachable bearing pins for roller drill bits can be attached and locked by this connection. Moreover, this type of connection can replace a threaded connection and also be used in conical connections for counteracting rotation between the conical elements.

I claim:

1. In an apparatus for connecting a male part to a female part of the type wherein the female part comprises a hole and a bore extending eccentrically across the hole, a locking pin disposed in the bore and spaced from a portion of the bore adjacent the hole to form a space, said male part comprising a shank, said shank including a groove for engagement with said locking pin, the periphery of said shank including a beveled portion of sufficient depth to allow a lower portion of the shank to pass the locking pin during insertion of said shank into said hole, said groove being disposed in such lower portion of said shank and arranged to receive said locking pin in response to rotation of said shank to prevent withdrawal of said shank, the improvement wherein said groove includes means for bending said pin into said space in a direction away from the axis of said hole during rotation of said shank, to resist reverse rotation of said shank.

2. Apparatus according to claim 1, wherein said locking pin is oriented orthogonally relative to the axis of said hole.

3. Apparatus according to claim 1, wherein said groove and said locking pin are located at the same level when the male part is inserted within the female part as far as it can go.

4. Apparatus according to claim 1, wherein said locking pin is formed of steel and is fixed within a bore in the female part by means of a spot weld.

5. Apparatus according to claim 1, wherein said groove further includes means for allowing said pin to spring-back at least partially from its initially bent condition during subsequent rotation of said shank.

6. Apparatus according to claim 3, wherein said means for bending said pin comprises a first circumferentially extending portion of said groove.

7. Apparatus according to claim 6, wherein said means for allowing said pin to spring-back comprises a second circumferentially extending portion of said groove, contiguous with said first portion, said second circumferentially extending groove portion being deeper than said first circumferentially extending portion.

8. In an apparatus for connecting a male part to a female part of the type wherein the female part comprises a hole and a locking pin extending eccentrically across the hole, said male part comprising a shank, said shank including a groove for engagement with said locking pin, the improvement wherein the periphery of said shank includes a beveled portion of sufficient depth to allow a lower portion of the shank to pass the locking pin during insertion of said shank into said hole, said groove being disposed in such lower portion of said shank and arranged to receive said locking pin in response to rotation of said shank to prevent withdrawal of said shank, wherein said groove comprises a first portion, the depth of said first groove portion being such as to cause said pin to be initially bent in a direction away from said shank during rotation of said shank, the depth of said second groove portion being greater than the depth of said first groove portion to allow said pin to spring back at least partially from its initially bent condition, so that said pin engages within said second groove portion to resist reverse rotation of said shank.

9. Apparatus according to claim 8, wherein said beveled portion of said shank extends axially, the depth of said beveled portion being greater than the depth of said second groove portion.

10. A male part adapted to be connected to a female part of the type comprising a hole and a bore extending eccentrically across the hole, a locking pin disposed in the bore and spaced from a portion of the bore adjacent the hole to form a space said male part comprising a shank, said shank being insertable in the hole of the female part and including a groove adapted to receive the locking pin, said shank including a beveled portion dimensioned to allow a lower portion of the shank into the hole, said groove being disposed in such lower portion of said shank and including means for bending said pin into said space in a direction away from the axis of said hole during rotation of said shank, to resist reverse rotation of said shank.

11. Apparatus according to claim 10, wherein said groove further includes means for allowing said pin to spring-back at least partially from its initially bent condition during subsequent rotation of said shank.

* * * * *